Patented Nov. 21, 1933

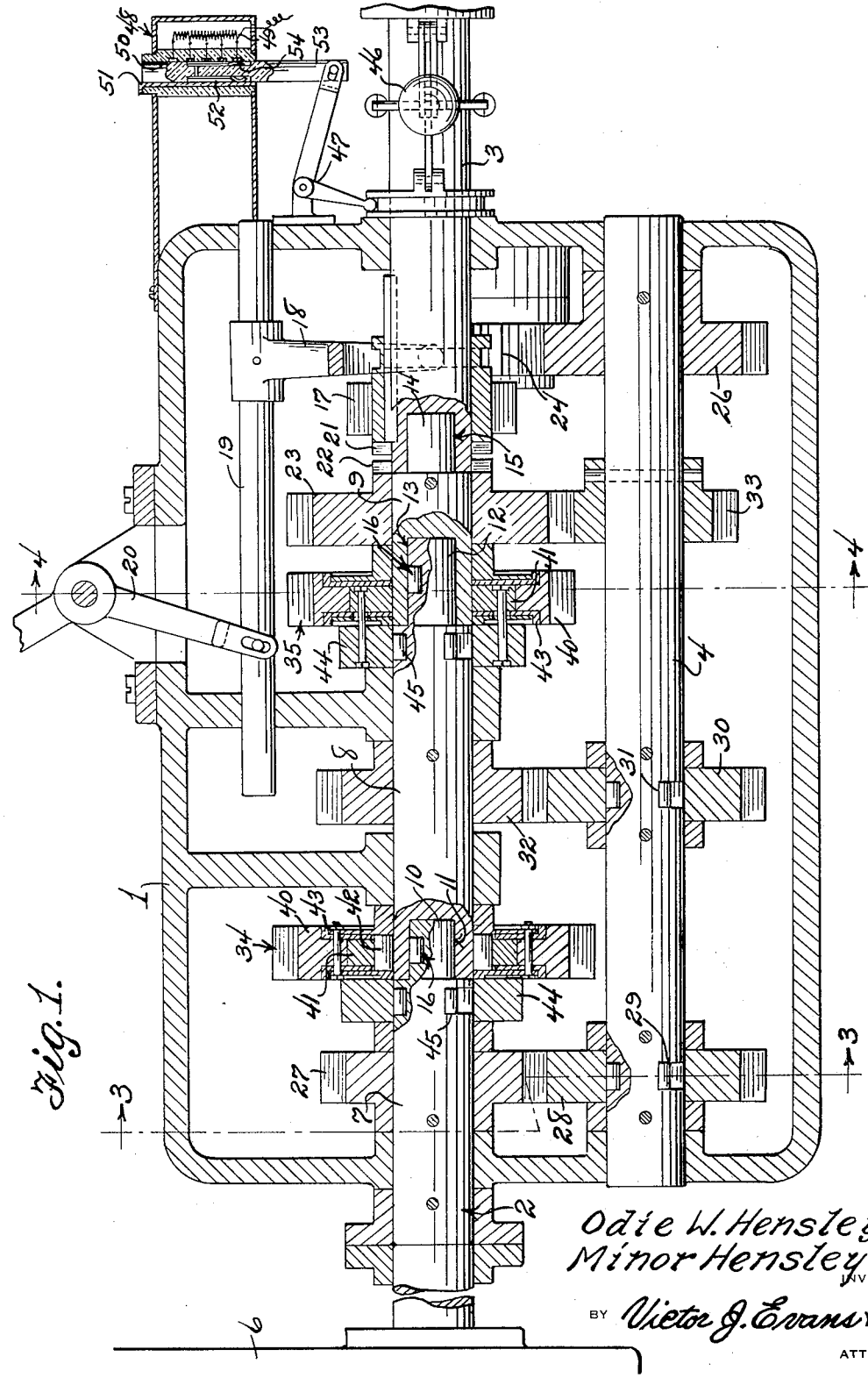

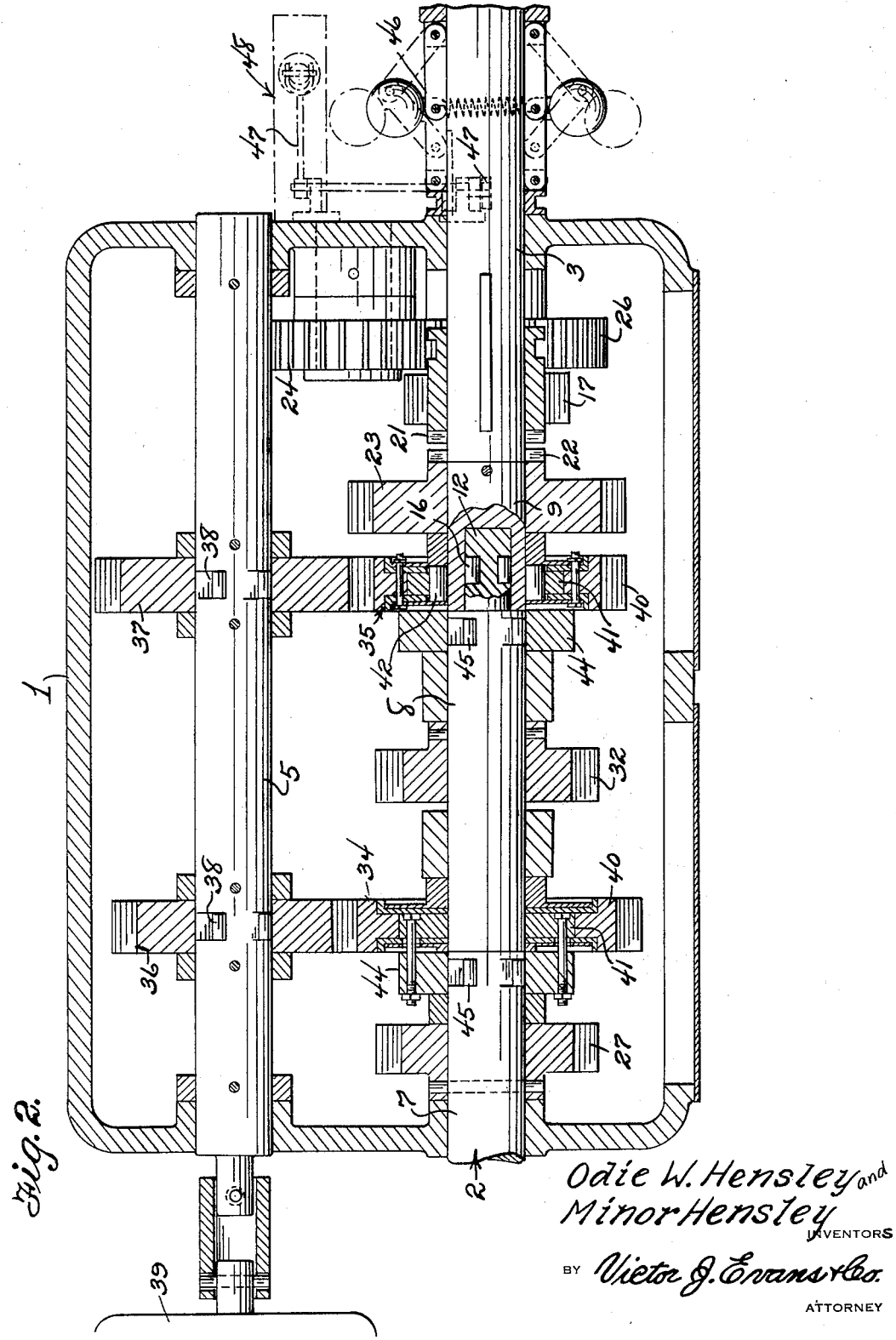

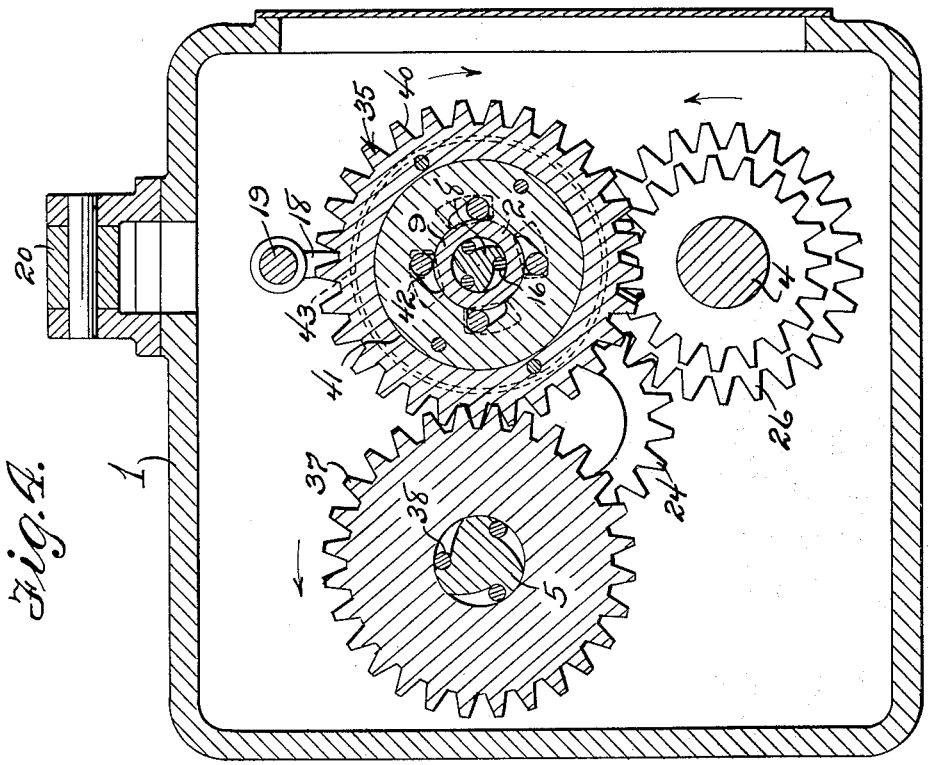
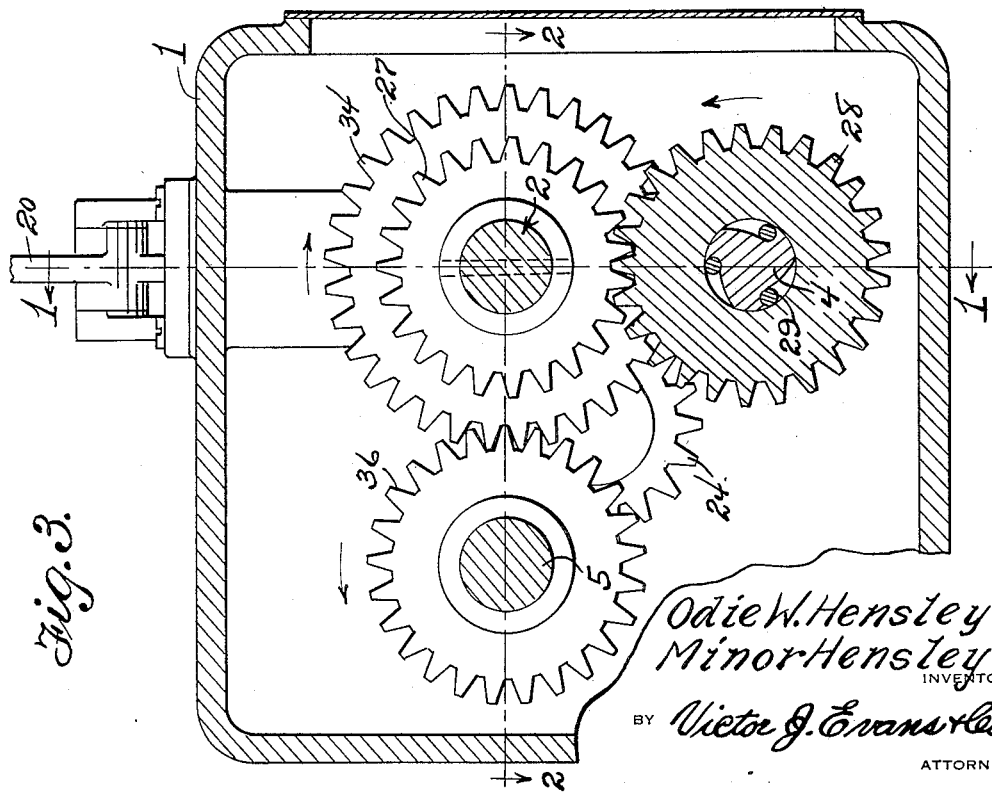

1,936,510

UNITED STATES PATENT OFFICE 1,936,510

TRANSMISSION GEAR SHIFT

Odie Wilson Hensley and Minor Hensley,
Lexington, Ky.

Application February 6, 1933. Serial No. 655,526

4 Claims. (Cl. 74—97)

This invention relates to transmissions adapted for providing variable speeds between a power source and a load and is especially adaptable for motor vehicles and has for the primary object, the provision of a device of the above stated character capable of providing forward and reverse to the vehicle under manual control and having automatic variable speeds for driving the vehicle forward under governor control actuated by the speed of the vehicle.

Another object of this invention is the provision of a power driven means under control of the governor for automatically changing the speeds of the transmission in accordance with the speed of the vehicle.

With these and other objects in view, this invention consists in certain novel features of construction, combination and arrangement of parts to be hereinafter more fully described and claimed.

For a complete understanding of our invention, reference is to be had to the following description and accompanying drawings, in which Figure 1 is a vertical sectional view illustrating a transmission constructed in accordance with our invention, and taken on the line 1—1 of Figure 3.

Figure 2 is a sectional view taken on the line 2—2 of Figure 3.

Figure 3 is a sectional view taken on the line 3—3 of Figure 1.

Figure 4 is a sectional view taken on the line 4—4 of Figure 1.

Referring in detail to the drawings, the numeral 1 indicates a transmission housing having journalled therein a power shaft 2 and a driven shaft 3 and a counter shaft 4 and an auxiliary shaft 5. The driven shaft 3 is adapted for connection with a load such as the rear wheels of a motor vehicle while the power shaft 2 at the forward end thereof is adapted to be connected to a power source or engine 6 of the motor vehicle through the ordinary clutch (not shown). The power shaft 2 includes sections 7, 8 and 9. The section 7 is provided with a reduced extension 10 fitting in a recess 11 of the section 8 for aligning the section 8 with the section 7. The section 8 is provided with an extension 12 fitting in a recess 13 in the section 9 for aligning the latter section with the section 8. The section 9 is provided with an extension 14 fitting in a recess 15 of the driven shaft 3 for retaining the latter in alignment with the section 9. Over-running clutches 16 are provided between the section 7 and the section 8 and between the latter named section and the section 9. The drive shaft 2 is adapted to turn in a clockwise direction by the engine 6, while the counter shaft 4 is adapted to turn in a counter clockwise direction and also the auxiliary shaft 5. The over-running clutches 16 are so arranged that the section 7 may rotate free of the section 8 in a clockwise direction and also the section 8 may rotate free of the section 9 in a clockwise direction. However, should the speed of rotation of the section 9 be greater than the section 8 then the section 9 becomes locked to the section 8 due to the respective overrunning clutch 16. When the speed of rotation of the section 8 is faster than the section 7, the respective overrunning clutch 16 locks these sections together. This operation is brought about when the wheels of the vehicle under momentum drive the motor through the driven shaft and the drive shaft 2, consequently preventing free wheeling between the rear wheels of the vehicle and the engine 6.

A forward and reverse gear 17 is splined to the driven shaft 3 and is connected in the usual manner to a shifting fork 18 carried by a slidable rod 19 located within the transmission housing and having slidable connection therewith. A pivoted control lever 20 is carried by the transmission housing and is pivotally and slidably connected to the rod 19 for shifting the latter in endwise direction causing corresponding movement of the gear 17 on the driven shaft 3. The gear 17 is provided with a clutch face 21 movable into and out of engagement with a clutch face 22 formed on a speed changing gear 23 secured to the section 9 of the drive or power shaft 2. With the clutch elements 21 and 22 in engagement a direct drive between the gear 23 and the driven shaft 3 is provided for the purpose of establishing forward motion to the vehicle. The gear 17 when shifted to disengage the clutch elements 21 and 22 may be moved either in a neutral position or in a position to mesh with an idle gear 24 journalled on a stub shaft carried by the transmission housing and which meshes with a gear 26 secured to the counter shaft providing reverse speed or gear to the transmission.

A gear 27 is secured to the section 7 of the power or drive shaft 2 and meshes with a gear 28 journalled on the counter shaft 4 and which has a driving connection with said counter shaft by an overrunning clutch 29. The purpose of the overrunning clutch 29 is to allow the counter shaft 4 to rotate faster than the rotation of the gear 28.

A speed changing gear 30 is journalled on the counter shaft 4 and has driving connection with said counter shaft through an overrunning clutch 31, the purpose of which is to permit the counter shaft when rotating faster than the gear 30 to turn free of said gear. The gear 30 meshes with a speed changing gear 32 secured to the section 8 of the power or drive shaft 2.

A gear 33 is secured to the counter shaft 4 and meshes with the gear 23 secured to the section 9 of the power driven shaft 2.

Low speed to the transmission is obtained from the section 7 of the power or driven shaft 2 by way of the gears 27 and 28, counter shaft 4 and gears 33 and 23 when the clutch elements 21 and 22 are in engagement.

Control gears 34 and 35 are carried by the power or drive shaft 2 and mesh with drive gears 36 and 37 respectively on the auxiliary shaft 5 and have between themselves and the auxiliary shaft overrunning clutches 38. The auxiliary shaft is driven by an electric motor 39 of small horse power or if desired an internal combustion engine of small horse power may be employed for driving the shaft 5 in a counter clockwise direction. The purpose of the overrunning clutches 38 is to establish driving connection between the auxiliary shaft 5 and the gears 36 and 37 but which will permit said gears 36 and 37 to rotate free of the shaft 5 should said gears rotate faster than the auxiliary shaft.

The control gears 34 and 35 are identical in construction and reference to one is thought sufficient for both. The control gear consists of a ring gear portion 40 mounted on a hub portion 41. The hub portion 41 of the control gear 34 is mounted on the section 8 of the drive shaft 2, while the hub portion 41 of the control gear 35 is mounted on the section 9 of the power or drive shaft 2. The hub portions 41 of the gears 34 and 35 have overrunning clutches 42 between themselves and their respective sections 8 and 9. The overrunning clutches are in the form of rollers operating in tapered grooves and the rollers are carried by elements or plates 43 fixed to the ring gear portions 40 so that on a slight movement of the ring gear portions relative to the hub portions 41 in one direction will cause the overrunning clutches to establish driving connection between control gears 34 and 35 and their respective sections 8 and 9 of the power or drive shaft 2. The hub portions 41 have secured thereto annular projections 44, one of which fits over the section 7 of the power or drive shaft while the other fits over the section 8 of the power or drive shaft. Overrunning clutches 45 are arranged between the sections 7 and 8 and the projections 44 of the control gears 34 and 35. The purpose of the overrunning clutch 45 of the control gear 34 is to establish driving connection between the section 7 and the hub 41 of said control gear 34. The overrunning clutch 45 of the control gear 35 is to establish a drive between the section 8 of the power or drive shaft and the hub portion 41 of said control gear 35.

A conventional type of governor 46 is mounted upon the driven shaft 3 and receives its operation or action by the rotation of said driven shaft and is connected to a pivoted lever 47 which is in turn conected to an electrical control 48 placed in circuit with the electric motor 39 and its power source. The electric control 48 is of the resistant type, including an electrical resistance 49 connected to spaced contacts 50 and one of the leads of the electric circuit while the other lead of the circuit is connected to a contact strip 51 engaged by a spring contact 52 carried by a slidable insulated plunger 53 connected to the arm 47. A resilient contact 54 is carried by the plunger 51 and electrically connected to the contact 52 and is adapted to move over the contacts 50 connected to the resistance 49. The movement of the plunger 53 in one direction increases the resistance in the electric circuit and when moved in the opposite direction decreases the resistance in the electric circuit. By the control 48 and the governor the speed of the electric motor 39 is controlled. The governor is adapted to decrease the speed of the electric motor 39 as the speed of rotation of the driven shaft 3 increases and as the speed of rotation of the driven shaft 3 decreases, the governor increases the speed of the motor 39.

The circuit of the electric motor 39 besides having the control 48 also is provided with a manually actuated switch (not shown) for the purpose of breaking the circuit between the electric motor 39 and its source when the device is not in use. However, when the device is to be used, the motor 39 is set in operation rotating the auxiliary shaft 5 which rotates the control gears 34 and 35 faster than the rotation of the power or drive shaft 2 disconnecting the section 7 from the section 8 and the latter named section from the section 9 thereby interrupting the drive between the power or drive shaft and the driven shaft 3. With the gear 17 shifted to engage the clutch element 21 with the clutch element 22, low speed to the transmission is obtained by the gear 27 of the section 7 driving the counter shaft 4 through the gear 28 and the counter shaft driving the driven shaft through the gears 33, 23 and 17. When the transmission is in low gear the driven shaft rotates slower than the drive or power shaft 2 or the section 7 thereof, consequently the overrunning clutches 16 between the sections 7, 8 and 9 permit the section 8 to turn relative to the section 7 and the section 9 to turn relative to the section 8. Second gear to the transmission is obtained when the driven shaft 3 reaches a pre-determined speed of rotation causing the governor to slow down the electric motor through the control 48 and the slowing down of the motor through the control gear 34 then establishes a drive between the section 7 and the section 8 of the power or drive shaft and the gear 32 rotates the gear 30 which in turn rotates the counter shaft 4 with the gear 28 ratcheting relative thereto. The gear 33 drives the gear 23 and the gear 23 drives the gear 17 which in turn drives the driven shaft for second speed. It being understood that the speed of rotation of the driven shaft in second gear is less than the speed of rotation of the section 8 of the power or drive shaft due to the ratios of the gears 32 and 30 as well as the gears 33 and 23. The third speed or direct drive of the transmission is obtained when the driven shaft 3 rotates fast enough to cause the control 48 to further slow down the electric motor. The section 7 having already been locked to the section 8 by the control gear 34, the drive is then from the section 8 to the section 9 by way of the control gear 35 and the gear 23 being secured to the section 9 drives the driven shaft 3 through the gear 17 being splined thereto, thus it will be seen that in high gear a direct drive is provided between the power or drive shaft and the driven shaft. When operating in direct or high speed and the load on the driven shaft increases to an extent to slow down the engine 6, the governor through the control 48 increases the speed of the electric motor causing the transmission to automatically enter into second gear and should the load on the driven shaft still increase, the governor through the control 43 further increases the speed of the electric motor to interrupt the drive between the sections 7 and 8 by the control gear 34 so that the drive is then in low gear by way of the gears 27 and 28, counter shaft 4, gears 33 and 23 and the gear 17 to the driven shaft.

While we have shown and described the preferred embodiment of our invention, it will be understood that minor changes in construction, combination and arrangement of parts may be made without departing from the spirit and scope of our invention, as claimed.

Having thus described our invention, what we claim is:

1. An automatic transmission comprising a housing, drive, driven, counter and auxiliary shafts journalled in said housing, said drive shaft consisting of a plurality of sections, overrunning clutches between the sections of the drive shaft, a manually controlled clutch between one of the sections and the driven shaft, speed changing gears fixed to the sections of the drive shaft, speed changing gears meshing with the first named speed changing gears and carried by the counter shaft, means securing one of said second speed changing gears to the counter shaft, overrunning clutches between the other of said second mentioned speed changing gears and the counter shaft, an auxiliary power means for rotating the auxiliary shaft at variable speeds, automatic means for varying the speed of rotation of the auxiliary power means in accordance with the speed of rotation of the driven shaft, and means actuated by the variable speeds of rotation of the auxiliary shaft to connect and disconnect the sections of the drive shaft to cause driving of the driven shaft by the power shaft through said speed changing gears to provide low and intermediate speeds to the transmission and to lock the sections of the drive shaft together to provide high speed to the transmission.

2. An automatic transmission comprising a housing, drive, driven, counter and auxiliary shafts journalled in said housing, said drive shaft consisting of a plurality of sections journalled relative to each other and one of said sections journalled relative to the driven shaft, intermeshing speed changing gears secured to one of the sections and the counter shaft, a control gear splined to the driven shaft, manually actuated means for shifting the position of the control gear, reversing gears between the control gear and the counter shaft, clutch elements between the reversing gear and the speed changing gear carried by one of the sections of the drive shaft, a pair of speed changing gears secured to sections of the drive shaft, a pair of speed changing gears meshing with the first named pair of speed changing gears and carried by the counter shaft, overrunning clutches between the second mentioned pair of speed changing gears and the counter shaft, overrunning clutches between the sections of the drive shaft, an auxiliary power source for rotating the auxiliary shaft at variable speeds, means for controlling the auxiliary power source in accordance with the speed of rotation of the driven shaft, and means between the auxiliary shaft and the sections of the drive shaft to automatically provide low and intermediate speeds to the transmission through said pairs of speed changing gears and to lock the sections of the drive shaft together to provide high speed to the transmission in accordance with the speed of rotation of the driven shaft.

3. An automatic transmission comprising a housing, drive, driven, counter and auxiliary shafts journalled in said housing, said drive shaft consisting of a plurality of sections journalled relative to each other and one of said sections journalled relative to the driven shaft, intermeshing speed changing gears secured to one of the sections and the counter shaft, a control gear splined to the driven shaft, manually actuated means for shifting the position of the control gear, reversing gears between the control gear and the counter shaft, clutch elements between the reversing gears and the speed changing gear carried by one of the sections of the drive shaft, a pair of speed changing gears secured to sections of the drive shaft, a pair of speed changing gears meshing with the first named pair of speed changing gears and carried by the counter shaft, overrunning clutches between the second mentioned pair of speed changing gears and the counter shaft, overrunning clutches between the sections of the drive shaft, an auxiliary power source for rotating the auxiliary shaft at variable speeds, means for controlling the auxiliary power source in accordance with the speed of rotation of the driven shaft, control gears carried by the sections of the drive shaft and driven from the auxiliary shaft, and overrunning clutches between the control gears and the sections of the drive shaft.

4. An automatic transmission comprising a housing, drive, driven, counter and auxiliary shafts journalled in said housing, said drive shaft consisting of a plurality of sections journalled relative to each other and one of said sections journalled relative to the driven shaft, intermeshing speed changing gears secured to one of the sections and the counter shaft, a control gear splined to the driven shaft, manually actuated means for shifting the position of the control gear, reversing gears between the control gear and the counter shaft, clutch elements between the reversing gear and the speed changing gear carried by one of the sections of the drive shaft, a pair of speed changing gears secured to sections of the drive shaft, a pair of speed changing gears meshing with the first named pair of speed changing gears and carried by the counter shaft, overrunning clutches between the second mentioned pair of speed changing gears and the counter shaft, overrunning clutches between the sections of the drive shaft, an auxiliary power source for rotating the auxiliary shaft at variable speeds, means for controlling the auxiliary power source in accordance with the speed of rotation of the driven shaft, control gears driven by the auxiliary shaft at variable speeds and carried by the sections of the drive shaft and each including inner and outer portions movable relative to each other, overrunning clutches between the sections of the drive shaft and the inner portion and controlled by the movements of the outer portion of said control gears, and overrunning clutches between the inner portions and the adjacent sections of the drive shaft to the sections on which the control gears are mounted.

ODIE WILSON HENSLEY.
MINOR HENSLEY.